July 13, 1965   B. BOUET   3,194,429
COOKING UTENSILS
Filed March 9, 1962   2 Sheets-Sheet 1
FIG.1
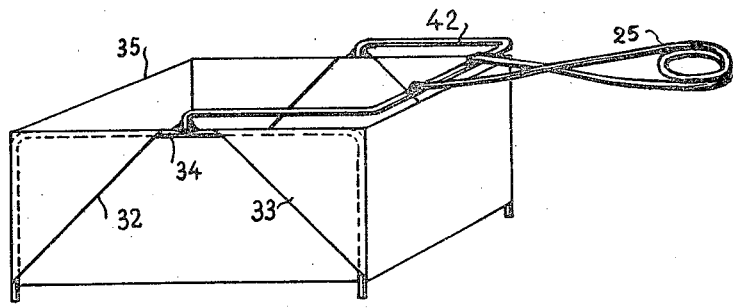
FIG.2
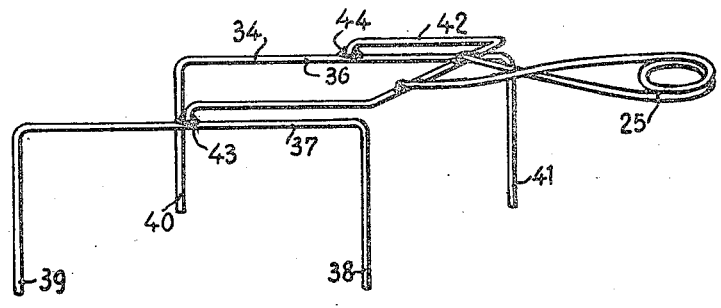
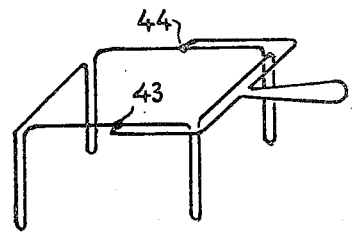
FIG.7
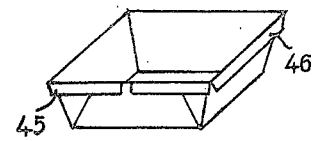
FIG.8

3,194,429
COOKING UTENSILS
Bernard Bouet, 65 Rue La Boetie, Paris, France
Filed Mar. 9, 1962, Ser. No. 178,780
Claims priority, application France, Mar. 9, 1961,
855,042
5 Claims. (Cl. 220—85)

This invention relates to novel and improved cooking utensils. In an important aspect, the invention is for a two-part cooking utensil comprising in combination a carrier frame of rigid metallic construction provided with a handle or similar gripping means, and a separate cooking container adapted to be separably connected with said frame for support thereby, said container being made of a suitable sheet material which has adequate strength and temperature-resistance properties to serve the purpose for which it is intended, while being preferably thin enough to be pliable and inexpensive so that the container may be discarded after having served one or more times.

The separate container part of the composite utensil may be easily stored in collapsed or/and stacked condition with other similar containers thereby reducing storage space. Since the container is made from a relatively small amount of inexpensive thin-gauge sheet material, it is economically feasible to use it is a dispensable article to be thrown away after having been used once or a few times depending on what it was used for; while the carrier frame portion of the combination is of course retained for subsequent association with other similar containers.

It is common experience that cooking pots and pans of the traditional rounded, more or less cylindrical, shape, are inconvenient to store in limited space, e.g. in a refrigerator, and take up considerably more space than their actual capacity would warrant. A generally rectangular container would obviously take up less shelf space; however, such a rectangular container of conventional character would be inconvenient especially for washing-up purposes due to its many reentrant corners. Moreover the projecting handle is a nuisance in storage. The separable container of the invention, in that it is dispensable and hence need not be cleaned after use, may be and preferably is made rectangular in horizontal cross section, thereby to save shelf space. Further it has no projecting handle. One convenient shape for the container is in the form of an inverted, truncated pyramid of rectangular or square cross section, whereby a plurality of such containers can conveniently be stacked for further saving storage space.

In a desirable form of the invention the carrier frame with its handle is formed from an assembly of press-shaped metal rods welded into a unitary structure. The frame is provided with legs or other supporting means whereby it can be stood stably on the kitchen range or on a table surface, with the bottom of the container carried by it spaced above the supporting surface.

According to a feature of the invention, the carrier frame and container are provided with cooperating inter-engaging elements for separably interconnecting the two units of the composite utensil and imparting rigidity to the thin-gauge container when supported on the frame.

The dispensable container unit of the invention may be made from any of various thin-gauge, heat-resistant sheet materials. Conveniently the said container is made from aluminum foil or aluminum alloy foil. Such a container may be provided in the form of a collapsible rectangular open-top box, somewhat resembling a carton. A large number of containers of this character can be stored in flattened, collapsed, form within a small volume of space. When required, the top container of the stack need simply be opened or squared out to its final erected form and placed on the carrier frame to provide a utensil having the requisite rigidity and other serviceable characteristics.

As an alternative to metal foil, other sheet materials, including specially treated paper board, composite metal and paperboard sheet, and the like, may be used to construct the dispensable containers of the invention. The containers are not necessarily collapsible as described above but may be press-formed to their final, rigid or semi-rigid shape, e.g. that of an inverted truncated pyramid as earlier mentioned.

Exemplary embodiments of the invention will now be described for purposes of illustration but not of limitation with reference to the accompanying drawings, wherein:

FIG. 1 is a perspective view of one preferred embodiment of the composite cooking utensil of the invention;

FIG. 2 shows the carrier frame of the utensil of FIG. 1 after removal of the separable container thereof;

FIG. 7 is a simplified perspective of another form of carrier frame for an improved utensil;

FIG. 8 is a similar view of another form of dispensable container usable with said carrier frame;

Figure 3:
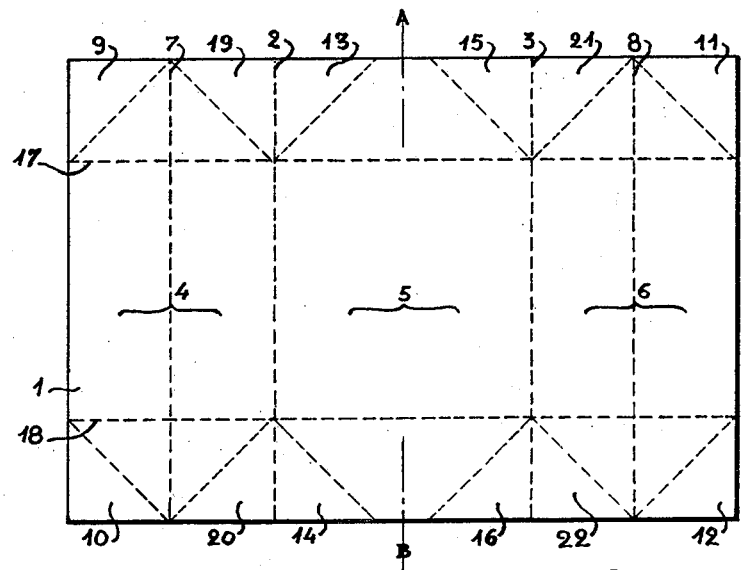
FIGS. 3, 4 and 5 illustrate in plan three successive stages in the folding of a blank of sheet material to provide a collapsible container for use in cooking utensil according to the invention.

Referring to the first embodiment of the invention shown in the drawings, the improved cooking utensil comprises a carrier frame 34 and a separable container 35 shown as made by folding aluminum foil. The carrier frame 34 (see especially FIG. 2) is made of metal rod stock, and includes a pair of similar side members having parallel spaced horizontal upper portions 36, 37, and downbent end portions 40–41 and 38–39 respectively, extending vertically downward from the ends of said horizontal portions and providing four legs for stable support of the structure on a surface. To the midpoints 44 and 43 of the horizontal portions 36, 37 respectively, are welded the downbent extremities of a U-shaped stirrup member 42 extending in a generally horizontal plane and having a handle 25, also made from suitably shaped rod stock, welded to the cross-member of said stirrup 42.

A carrier structure of the type just described is especially suitable for use with a folded-foil "carton"-type container of a construction further described in detail, for the following reasons. As will appear from FIG. 6, which is a separate view of such a container, the erected container of this type has a pair of corner folds 32 and 33 on its opposite lateral sides, and it will be apparent that the two side members of the carrier frame of FIG. 2 can be inserted upwards into said folds and along said lateral side walls of the erected container 35 so that the upper horizontal portions 36 and 37 of said side members will enter and extend along the horizontal upper fold lines present on said side walls, while the four vertical legs of the frame extend along the vertical end fold lines of said side walls, thereby imparting full rigidity to the container. The welded ends 43 and 44 of the handle then project through the clearances present between the adjacent ends of the corner folds 32 and 33 at the top of each side wall of the container. The frame structure is preferably so predetermined that the center of gravity of the erected utensil when filled or partly filled is positioned quite close to the vertical plane extending through the welded ends 43, 44 of the handle. It will further be noted from FIG. 1 that the leg portions 38, 39, 40, 41 of the frame are sufficiently long that the bottom of the container is spaced above the supporting surface.

It will be evident that the carrier frame structure may be made in various other ways than that just described, as from press-shaped metal sheet for example; however, the metal rod, or thick-gauge wire construction here described is especially advantageous for economical and other reasons.

In the modified frame construction shown in FIG. 7, it will be noted that the entire frame is made from only two lengths of wire or rod. One length is bent to provide the sides, top and legs of the frame, and the other is bent to provide the handle, with the two protruding ends of this latter length being welded as at 43 and 44 to intermediate points of the sides of the first length or stand. Thus constructed the carrier frame of FIG. 7 may be used with the same type of container 35 as that in FIGS. 1 and 2, as above described.

Figure 9:
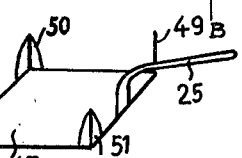
FIG. 9 is a similar view of a further form of carrier frame in an embodiment of the invention.

In a further exemplary embodiment shown in FIG. 9 the carrier frame includes a rigid bottom wall or base 47 of sheet metal, shown solid but possibly perforate if preferred. Upstanding from the four corners of the base 47 are projections 48, 49, 50, 51 adapted to enter upwardly into the vertical side folds of the container shown in FIG. 6 in a manner similar to that earlier described. The projections may be stamped integrally with the base 47 from a common sheet blank, as shown for the two diagonally opposed projections 50, 51 which further are formed with vertical side flanges at right angles to impart further rigidity to the mounted container; or said projections may simply be pins welded to the corners of base plate 47 as shown at 48 and 49. A carrier frame provided with a base plate such as the one shown in FIG. 9 may have an advantage in that it may provide a bottom support for the container 35 in the case of especially large-size and/or thin-gauge containers.

Figure 6:
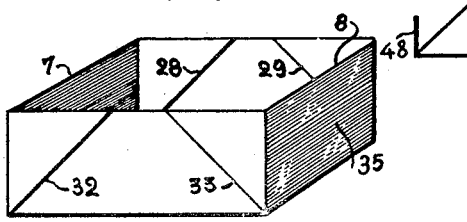
FIG. 6 is a smaller-scale perspective view of the erected collapsible container.

The rectangular container 35 shown in FIG. 6 and previously referred to, adapted to be made from metal foil or other pliable heat-resistant material in a manner presently to be described, is especially advantageous owing to its collapsible character whereby it can be flattened for storage. It will further be noted from FIG. 6 that in addition to the outer corner folds 32, 33 earlier referred to, there are provided inner corner folds such as 28, 29, on the inner surface of each of two opposite side walls, which may serve for the removable engagement therein of prehensile means such as suitable tongs.

FIG. 8 shows another form of dispensable container according to the invention which is not collapsible. Instead it is formed in the shape of a rigid or semi-rigid inverted pyramid frustum, for convenience in stacking. Flanges such as 45, 46 are provided extending integrally outward from two or more sides at the top of the container for engagement with appropriate upper parts of the carrier frame, such as the portions 36, 37 of the carrier frame of FIG. 2.

Figure 4:
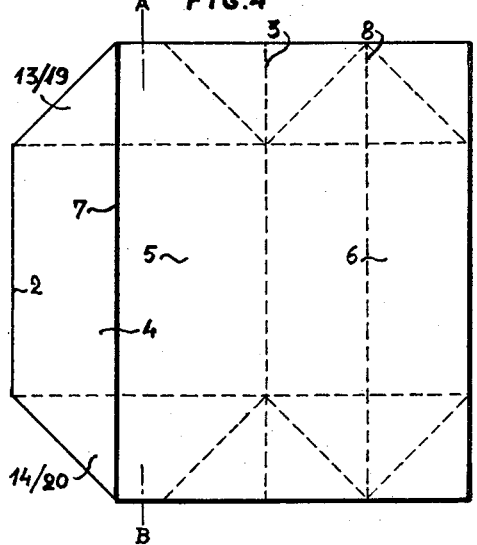
Figure 5:
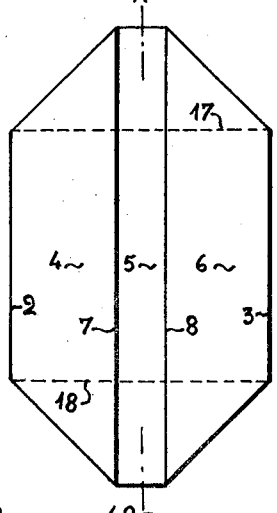

There will now be described with reference to FIGS. 3 to 5, a simple and efficient method of producing a collapsible container of the type shown at 35 in FIGS. 1 and 6, starting with a flat rectangular blank 1 of appropriate pliable sheet material, e.g. aluminum foil of appropriate gauge. Referring to FIG. 3, the rectangular blank is shown divided (preferably by score lines) into three rectangular portions, the two equal end portions 4 and the slightly wider intermediate portion 5. Portion 4 is folded down over portion 5 around the line 2. The upper left-hand corner of the doubled-over portion 4 of the blank now comprises the surface areas indicated by 13 and 19 in FIG. 1, lying face-to-face, and the lower left-hand corner similarly comprises the areas indicated at 14 and 20, face-to-face. The two said left-hand corners are now folded down at a 45° angle to the right. The right-hand corners of the doubled-over portion 4 of the blank, comprising the areas 9 and 10, are similarly folded down at 45° to the left. Next the right-hand half of the portion 4 is folded down over the left-hand half thereof around the line 7. The appearance of the blank is now as shown in FIG. 4. Identical operations are performed symmetrically on the portion 6. The resulting shape, shown in FIG. 5, constitutes the finished collapsible container in flattened condition. It can then immediately be squared out to provide the container 35 shown in FIG. 6. Portion 5 forms the bottom of the container, while portions 4 and 6 each of them doubled, form two opposite sides of it. The remaining opposite two sides comprise the outer and inner corner folds 32–33 and 28–29 visible in FIG. 6 and the utility of which in one form of the invention has previously been indicated. The folding process thus described is readily amenable to mechanization. In addition to providing the useful corner folds, the resulting structure has comparative rigidity. At the same time when flattened its maximum vertical thickness is very small, even though in that condition the corner portions comprise six elementary plies of the sheet.

It should be understood that the folding procedure described and shown while being advantageous is exemplary only and other procedures could be used. For example the portions 4 and 6 may be doubled over only part of their total height rather than the full height as shown.

One advantageous commercial application of the novel utensil of the invention is in connection with individual meal rations. The rations may be sold or handed out already packed in containers according to the invention, of any suitable type, including a cover or lid (not shown), and of a single standard size. The purchasers of other recipients of the meal rations would simply be required to carry with them an individual carrier frame of any of the types heretofore described, so that the meal package can be directly inserted by each person into his individual carrier frame and heated over any available source of heat.

What I claim is:

1. A cooking utensil comprising, in combination, a collapsible container constituted by a single sheet of pliable heat-resisting material having longitudinal and transverse fold lines to form a bottom, two side walls and two double end walls integral with said side walls, said two double end walls having mutually facing corners formed along diagonal fold lines in the collapsed condition of the container to constitute, in a folded condition of the container, four inner and four outer pockets of triangular contour having free edges which are upwardly inclined each from one of the four corners of said bottom wall, respectively, to the top edge of said side side walls, and a carrier frame engageable in said outer pockets for supporting the container in the folded condition thereof.

2. A cooking utensil comprising a collapsible container constituted by a single sheet of pliable heat-resisting material having two parallel longitudinal fold lines defining a flat horizontal bottom wall and two vertical side walls; said sheet having in the flat unfolded condition thereof four parallel transverse fold lines defining two vertical double end walls integral with said side walls, each of said end walls having an inner section and an outer section, the outer section being in folded relation to overlie the corresponding inner section, said container presenting in collapsed condition four corner portions folded on diagonal fold lines to lie against the inner face of said inner section and the corners of said outer sections being also folded on diagonal fold lines to lie between said corner portions and the inner face of the outer sections, said container being assembled by outward displacement of the end walls to cause said corner portions to deflect along said two longitudinal fold lines and inward and outward displacement of the side walls into erect position in which the corners of the outer sections of the end walls constitute two pairs of longitudinally spaced pockets of substantially triangular contour the free edges of which converge upwardly from the lower corners of the container to the top edge of the side walls, said pockets being adapted to receive and support stiffening members for said container.

3. For use with a carrier frame having a rectangular outline and legs defining corners for said outline, a one piece container constituted by a sheet of foldable material and having fold lines to provide a bottom and erect side walls integral with said bottom, said container having opposite side walls which include triangular flap portions folded thereover, said flap portions having free edges which extend diagonally upwardly from said bottom to define a pocket with the respective side wall, said flap portions being substantially symmetrically located to accommodate the legs of the carrier frame whereby the container may be supported from the carrier frame.

4. A cooking utensil comprising a rigid carrier frame including four vertical leg portions defining a rectangle, a pair of parallel horizontal side portions defining opposite sides of said rectangle and connected to said leg portions, a handle portion projecting from said frame, said handle portion having spaced ends secured to intermediate locations on respective side portions, a one piece container constituted by a sheet of foldable material having a bottom and erect side walls extending integrally from said bottom along fold lines, triangular flap portions integral with said sheet and foldably overlying opposite side walls to form therewith triangular shaped pockets having openings facing in the direction of said bottom, said pockets being located on said container in corresponding relation with the legs of the frame whereby said container is adapted for being supported from said frame with the legs thereof accommodated in said pockets.

5. A utensil as claimed in claim 4 comprising a flat base plate on said frame for underlying and supporting the bottom of the container when the legs of the frame are accommodated in respective pockets of the container.

References Cited by the Examiner
UNITED STATES PATENTS

| | | | |
|---|---|---|---|
| 1,563,907 | 12/25 | Koff | 229—41 |
| 1,760,325 | 5/30 | Small | 229—41 |
| 2,148,439 | 2/39 | Crawford. | |
| 2,174,425 | 9/39 | Schlumbohm | 229—3.5 |
| 2,842,116 | 7/58 | Hinderer | 126—9 |
| 2,888,179 | 5/59 | Daggett | 220—85 |
| 2,970,735 | 2/61 | Jacke et al. | 229—3.5 |
| 2,990,096 | 6/61 | Crosby | 229—3.5 |

FOREIGN PATENTS 489,561  7/38  Great Britain.

THERON E. CONDON, *Primary Examiner.*

EARLE J. DRUMMOND, FRANKLIN T. GARRETT, *Examiners.*